United States Patent
Gass et al.

(10) Patent No.: US 8,651,056 B2
(45) Date of Patent: Feb. 18, 2014

(54) PET WATER BOWL COOLING SYSTEM

(76) Inventors: Paul Gass, Goodyear, AZ (US); Jon Shrader, Clovis, NM (US)

( * ) Notice: Subject to any disclaimer, the term of this patent is extended or adjusted under 35 U.S.C. 154(b) by 53 days.

(21) Appl. No.: 13/297,096

(22) Filed: Nov. 15, 2011

(65) Prior Publication Data

US 2013/0014701 A1     Jan. 17, 2013

Related U.S. Application Data

(63) Continuation-in-part of application No. 13/182,307, filed on Jul. 13, 2011.

(51) Int. Cl.
*A01K 7/02*     (2006.01)

(52) U.S. Cl.
USPC .............................................. 119/73; 119/72

(58) Field of Classification Search
USPC ........................ 119/72, 73, 74, 75, 78, 61.5
See application file for complete search history.

(56) References Cited

U.S. PATENT DOCUMENTS

| | | | | | |
|---|---|---|---|---|---|
| 3,196,835 | A | * | 7/1965 | Bergevin | 119/51.11 |
| 3,855,970 | A | * | 12/1974 | Harwood | 119/260 |
| 4,151,810 | A | * | 5/1979 | Wiggins | 119/262 |
| 4,248,176 | A | * | 2/1981 | Kilstofte | 119/72 |
| 5,782,035 | A | * | 7/1998 | Locke et al. | 47/79 |
| 5,813,363 | A | * | 9/1998 | Snelling | 119/73 |
| 7,624,702 | B1 | * | 12/2009 | Fritz | 119/74 |
| 8,117,991 | B1 | * | 2/2012 | Civitillo | 119/73 |
| 8,146,535 | B1 | * | 4/2012 | Neumann | 119/73 |
| 8,381,685 | B2 | * | 2/2013 | Lipscomb et al. | 119/74 |
| 2008/0190374 | A1 | * | 8/2008 | Farris | 119/74 |
| 2012/0111280 | A1 | * | 5/2012 | Shin et al. | 119/78 |

* cited by examiner

*Primary Examiner* — Son T Nguyen
(74) *Attorney, Agent, or Firm* — Morgan Law Offices, PLC

(57) ABSTRACT

A pet bowl water cooling system includes a bowl, a pump for removing water from the bowl, a heat transfer device, and a conduit adapted to carry the water to the heat transfer device, to carry cooled water back to the bowl. The heat transfer device can include a metal coil submersed in a relatively cool liquid medium. Preferably, the bowl includes a float valve to allow water to flow into the bowl when the float valve is activated. In an embodiment, the liquid medium includes water in a water reservoir of an evaporative cooler. In an embodiment, the evaporative cooler includes a housing that is disposed between studs of a wall. The dog bowl can be mounted on an interior wall or an exterior wall. In an embodiment, the evaporative cooler is disposed within a wall of a dog house and the dog dish is mounted thereon.

14 Claims, 6 Drawing Sheets

PET WATER BOWL COOLING SYSTEM

CROSS REFERENCE TO RELATED APPLICATIONS

This application is a continuation-in-part of U.S. patent application Ser. No. 13/182,307 to Paul Gass, entitled "Evaporative Cooling System Installed in a Structure Wall," filed Jul. 13, 2011, still pending.

FIELD OF THE INVENTION

The present invention relates to the field of water cooling, and, more particularly, to a cooling system to cool water within a pet bowl.

BACKGROUND

A serious danger for pets during the summer months is that they will overheat. Dogs are particularly vulnerable in that they do not sweat but rather cool their bodies by panting. Panting involves fast breathing to cause saliva in the mouth to evaporate thereby cooling the dog. Fortunately, dogs can be kept cool and comfortable in most cases by providing sufficient quantities of cool water. Many dog owners will refill dog bowls with cool water, sometimes including ice. However, when the owner is not home during the day or forgets, the dog can suffer.

To remedy the forgoing problem, prior art devices have been developed to provide cool pet water. For example, U.S. Published Patent Application No. 2009/0120370 to Maeda, entitled "Water Drinking Container for Animals", discloses a pet bowl with a compartment in which a frozen material is placed. The frozen material can be contained in a plastic bag and will cool the water in the bowl much as ice would. A downside of this approach is that the frozen material eventually melts and must be re-frozen. As another example, U.S. Published Patent Application No. 2007/0022964 to Reusche et al., entitled "System and Method for Cooling Water within a Pet Bowl", discloses a pet bowl having a porous container, wherein water passes through the porous container and wicks to an outer surface. The portion of the water that wicks to the outer surface evaporates, thereby cooling the water within the bowl. Furthermore, the device includes a fan to blow air over the outer surface of the porous container to promote quicker evaporation.

SUMMARY OF THE INVENTION

One aspect of the disclosure relates to a water cooling device. In one embodiment, the water cooling device includes a bowl, a pump adapted to remove water from the bowl, a heat transfer device, and a conduit, the conduit including a first conduit portion adapted to carry the water to the heat transfer device, and a second conduit portion adapted to carry cooled water back to the bowl. In a preferred embodiment, the bowl is a dog bowl, the pump is a submersible pump, and the heat transfer device includes a metal coil submersed in a liquid medium. Preferably, the bowl includes a float valve structured and arranged to allow water from a plumbing source to flow into the bowl when the float valve is activated. In an embodiment, the liquid medium includes water in a water reservoir of an evaporative cooler. In an embodiment, the evaporative cooler includes a housing that is disposed between studs of a wall. Preferably, in the in-wall embodiment, the water cooling device and the evaporative cooler are supplied with water from the same pipe within the same wall. The dog bowl can be mounted on an interior wall using brackets, or using another technique. Alternatively, the dog bowl can be mounted on an exterior of a building. In an embodiment, the water cooling system includes the evaporative cooler disposed within a wall of a dog house and the dog dish mounted on the wall inside the dog house, providing an ideal environment during the summer.

These and other aspects, features, and advantages of the present invention will become apparent from the following detailed description of preferred embodiments, which is to be read in connection with the accompanying drawings.

DETAILED DESCRIPTION

Figure 1:
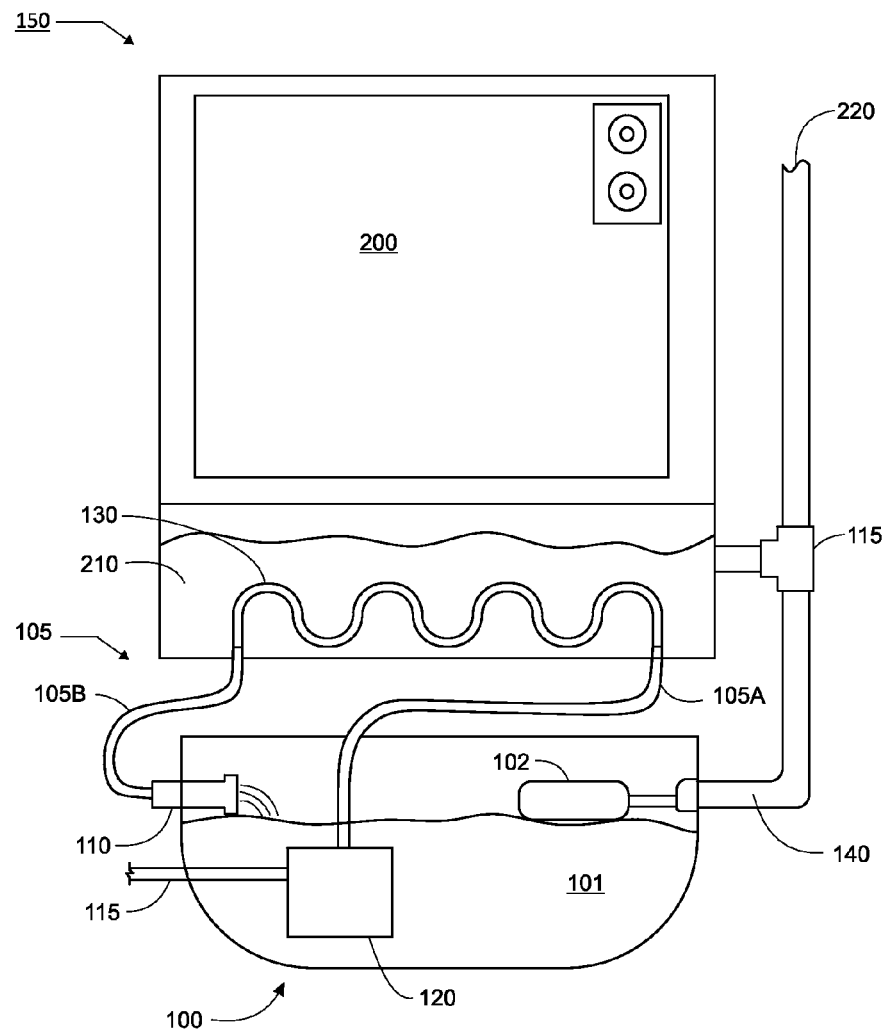
FIG. 1 shows a functional block diagram of an exemplary pet bowl water cooling system, according to an embodiment of the invention.

FIG. 1 is a functional block diagram of an exemplary pet bowl water cooling system 150, according to an embodiment of the invention. Initially, a pet bowl 100 is filled with water from a first inlet 140. The pet bowl 100 can include a float valve 102 that is structured and arranged to allow water to flow into the pet bowl 100 from the first inlet 140 until the water 101 reaches a predetermined level in the pet bowl 100. When a pet, such as a dog, drinks a sufficient quantity of the water 101 from the pet bowl 100, the float valve 102 is activated so that the pet bowl 100 is again filled to the predetermined level. Preferably, the first inlet 140 is fluidly connected to a wall pipe (as shown), but the first inlet 140 could, alternatively, be supplied by another source, such as a hose. In an embodiment, the pet bowl 100 is made of a durable plastic, such as high-density polypropylene, and holds about 1.5 gallons. However, the pet bowl 100 can be constructed of other materials (e.g., stainless steel) and have a different volume capacity.

In the illustrated embodiment, the pet bowl 100 is fluidly connected to an evaporative cooler 200 via a conduit 105. The conduit 105 includes a first conduit portion 105A and a second conduit portion 105B. As will be described in greater detail, in operation, water is pumped from the pet bowl 100 through the first conduit portion 105A and into a heat transfer device 130 disposed in the water reservoir 210 of the evaporative cooler 200 where the water is cooled. The cooled water is then returned via the second conduit portion 105B to the pet bowl 100 through a second inlet 110.

The conduit 105 can be any suitable tubing (e.g., ¼ inch polyethylene drip irrigation tubing) or piping. Most preferably, the evaporative cooler 200 and the pet bowl 100 are supplied by water from the same plumbing source 220, and a T-connector 115 is used to divide the water supply, as shown and as is known in the art.

The heat transfer device 130 can be include any suitable tubing or piping, shaped in any manner, to facilitate heat transfer from the water passing through the heat transfer device 130 to a liquid medium having a lower temperature. However, preferably, to increase surface area exposure, the tubing or piping will be a coil. In an embodiment, the heat transfer device 130 is a copper coil disposed within the water reservoir 210 of the evaporative cooler 200. To hold the coil in place at the bottom of the water reservoir 210, a plurality of clips (not shown) can be provided on the bottom surface, or the bottom surface can include an accommodating groove wherein a coil can be frictionally fit (not shown).

To effect the pumping of water to the heat transfer device 130, the pet bowl 100 includes a pump 120, which preferably is a submersible pump disposed (partly or completely) in the water 101. However, the pump does not have to be placed in the water 101 (e.g., it can be external to the pet bowl 100). As shown, the pump 120 includes a power cord 115 which would be connected to an appropriate power source (e.g., 120V AC). In other embodiments, the pump is powered by batteries. The pump 120 can be a submersible pump rated at about 190 gallons per hour (gph), for example.

Figure 2:
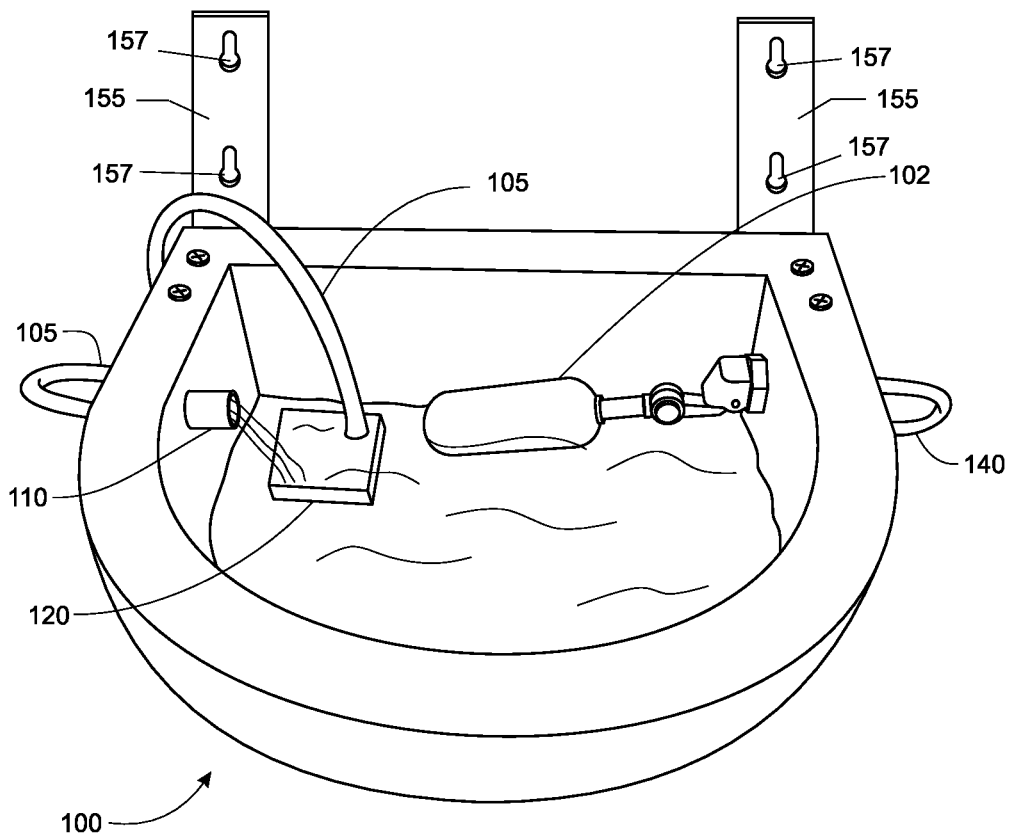
FIG. 2 shows a perspective view of the dog bowl portion of the present invention, according to an embodiment of the invention.

Referring to FIG. 2, a perspective view of the dog bowl 100, according to an embodiment of the invention, is illustrated. As shown, the dog bowl 100 can be mounted using a pair of mounting brackets 155. It is to be understood that the mounting brackets 155 would be secured in a wall by screwing a screw (not shown) in each of the screw holes 157 to support the weight of the pet bowl 100. Of course, the screw holes 157 could instead be placed in a back surface of the pet bowl (hidden from view), or the pet bowl 100 could be mounted in another manner, such as by using an adhesive (e.g., epoxy), etc. In an embodiment, the pet bowl is not mounted to a wall, but, instead, is placed on the ground. In this embodiment, the pet bowl 100 can include legs or another supporting mechanism.

Figure 3:
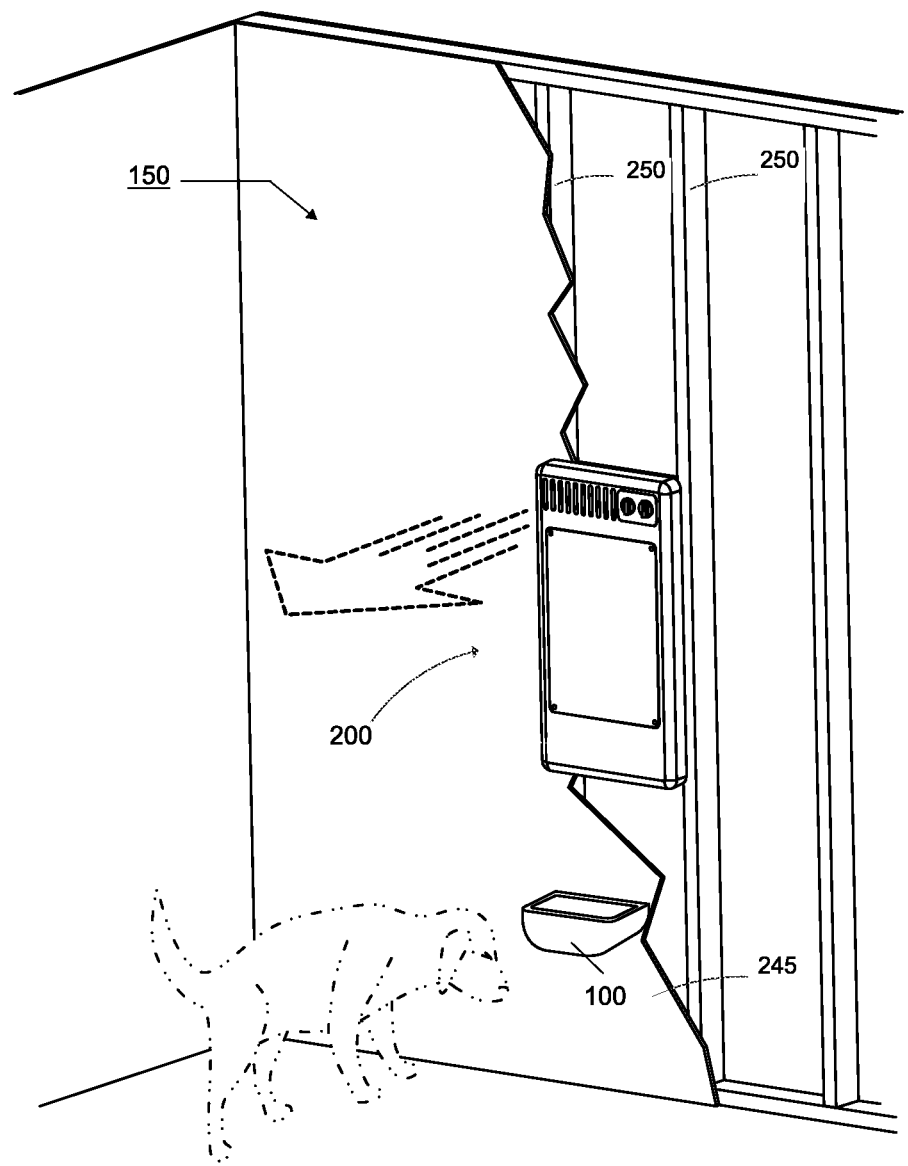
FIG. 3 shows an exemplary pet bowl water cooling system including an evaporative cooler mounted within a wall and a dog bowl mounted on an exterior surface of the same wall, according to an embodiment of the invention.

FIG. 3 shows an exemplary pet bowl water cooling system 150 including the evaporative cooler 200 disposed in a wall 245 between a pair of opposing wall studs 250. In this embodiment, the pet bowl 100 is mounted on the interior surface of the wall 245, as shown. An evaporative cooler 200 suitable for use in conjunction with this embodiment of the present invention is described in co-pending U.S. patent application Ser. No. 13/182,307 to Gass et al., entitled Evaporative Cooling System Installed in a Structure Wall, filed Jul. 13, 2011, which is incorporated by reference in its entirety.

Figure 4:
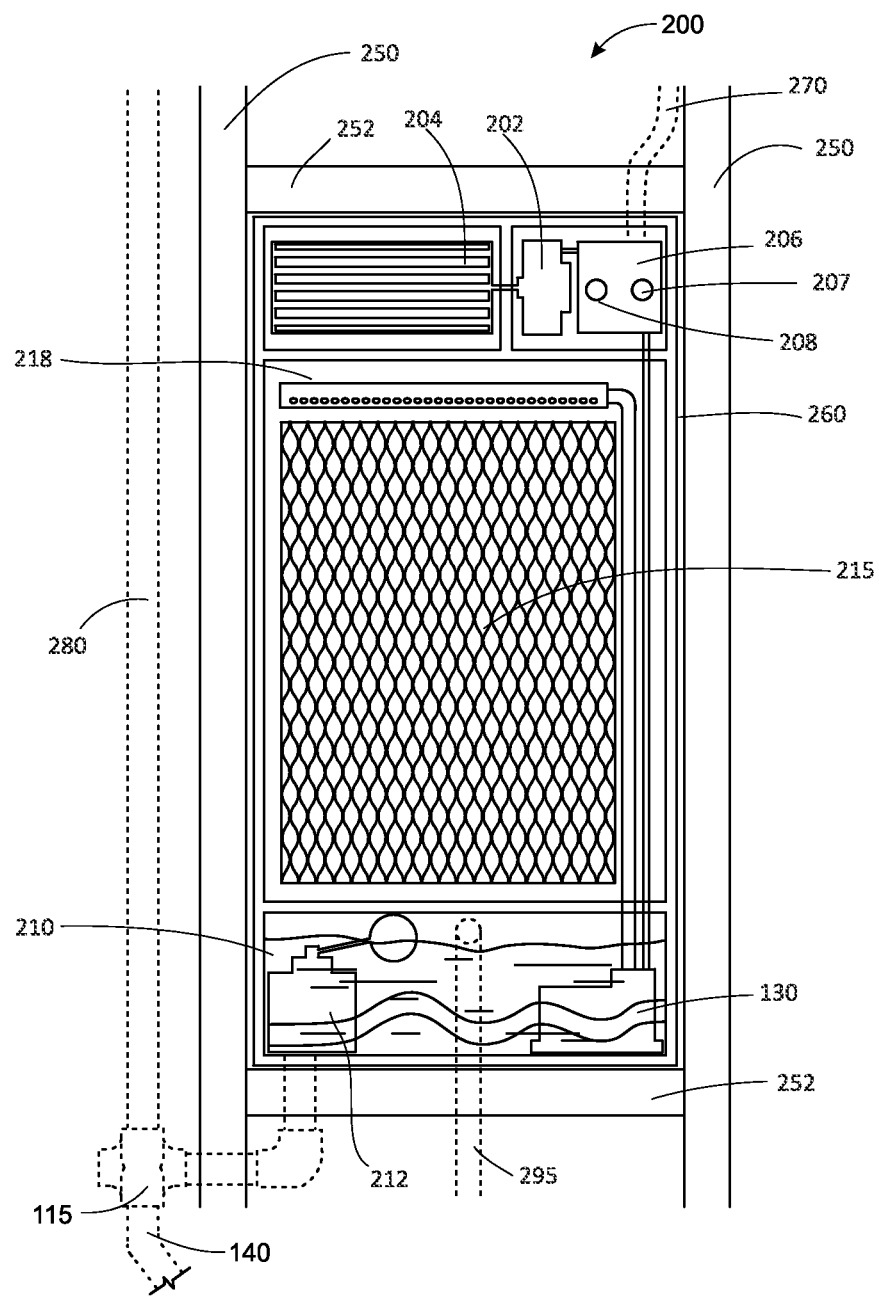
FIG. 4 shows an exemplary evaporative cooler incorporating an exemplary heat transfer device submersed within the water reservoir of the evaporative cooler, according to an embodiment of the invention.

FIG. 4 shows this evaporative cooler 200 incorporating the heat transfer device 130 submersed within the water reservoir 210 of the evaporative cooler 200. The evaporative cooler 200 is depicted with the front cover removed for illustrative purposes. As shown, the evaporative cooler 200 includes a housing 260 that includes therein the following components: an electric motor 202, a fan 204, user controls 206 (including an on/off switch 207 and a speed-selection switch 208), a water reservoir 210, a ball float valve 212, a water pump 214, a water distributor 218, an evaporative pad 215, and an overflow drain system 295. As shown, the housing 260 of the evaporative cooler 200 is disposed between a pair of wall studs 250. In an embodiment, the wall studs 250 are spaced about sixteen inches on center. This leaves about 14.5 inches between the wall studs 250, and the housing 260 will preferably be about 14 inches in width to ensure proper fit. The 14 inches allows for there to be approximately 0.25 inches on each side of the housing 260 between the wall studs 250 in case they are not exactly centered or if there is a bow in the wall stud 250. In this embodiment, the housing 260 may be about 4 to 6 inches in thickness and about 24 inches in height, protruding no more than about three inches from the inside wall. In other embodiments, the wall studs 250 will be spaced differently and/or the thickness of the wall studs 250 will be different (e.g., 2×6 inch studs). In one embodiment the wall studs 250 will be spaced 24 inches on center leaving a space of 22.5 inches to accommodate the housing 260, so that the housing 260 can be made wider in this case. In 2×6 construction, the wall studs 250 would be 5.5 inches deep and the drywall would be ½ inch, so the housing 260 would not protrude from the structure wall 140 as much (or at all) as in the case of 2×4 inch wall studs 250.

In operation, the water pump 214 brings water from the water reservoir 210 to the water distributor 218, and the water distributor 218 distributes the water to the evaporative pad 215 thereby moistening it. The fan 204, which is oriented to blow air into the room, creates an air path whereby relatively warmer/dryer outside air flows into ventilation grill 290, and is channeled to the evaporative pad 215, thereby cooling the air by evaporation. The cooled air then flows through an opening 235 in the front cover 230. At least some of the water from the evaporative pad 215 will fall back to the water reservoir 210 for recirculation. When the evaporative cooler 200 operates, the water in the water reservoir 210 is maintained at a relatively cool temperature, and is thus suitable for use as a liquid medium for the heat transfer device 130.

Figure 5:
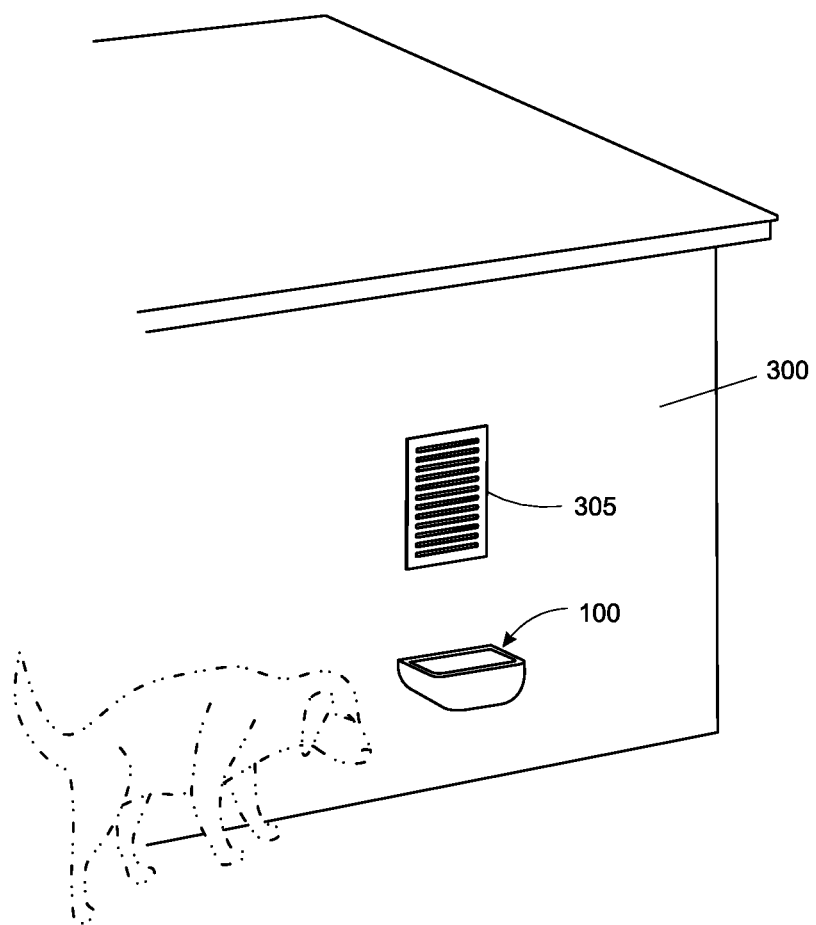
FIG. 5 shows the pet water bowl cooling system with the dog bowl mounted on an exterior surface, according to an embodiment of the invention.

Although the pet bowl water cooling system 150 has thus far been described as having the pet bowl 100 disposed within an interior of a structure, the pet bowl can, alternatively, be placed on the exterior, such as on an outside wall 300, as is illustrated in FIG. 5. As depicted in FIG. 5, the pet bowl 100 is mounted below a ventilation grill 305 which brings fresh air to the evaporative cooler 200. In this case, the conduit 105 would have pass through holes in the exterior of the structure to reach the evaporative cooler 200 within the wall. Preferably, in this embodiment, the pet bowl 100 is supplied by water from a hose rather than the indoor plumbing.

Figure 6:
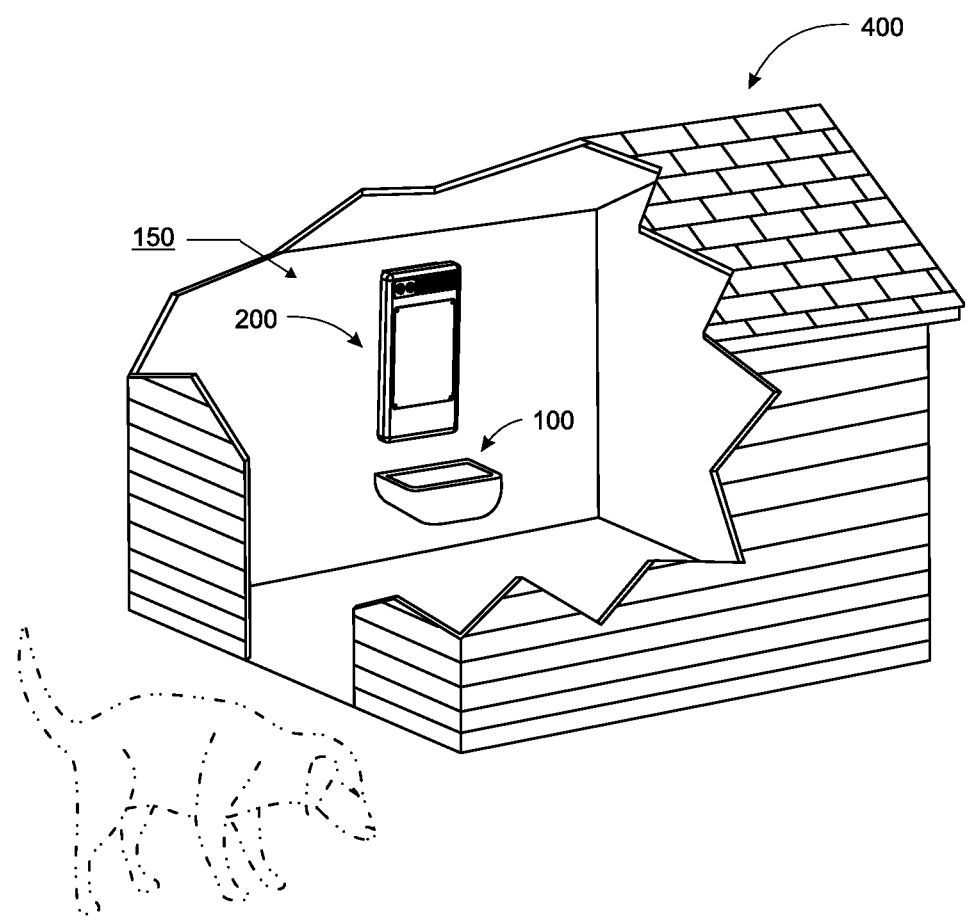
FIG. 6 shows an exemplary dog house equipped with the pet cooling system, according to an embodiment of the invention.

FIG. 6 shows an exemplary dog house 400 equipped with the pet water cooling system 150, according to an embodiment of the invention. In this embodiment, the dog house 400 includes the evaporative cooler 200 installed within a wall of the dog house 400 and the pet bowl 100 is also mounted thereon. The dog house 400 can be a standalone structure equipped with electricity and a water supply. In such a case, a dog would enjoy the benefit of a cool environment from the combination of the evaporative cooler 200 and the pet water cooling system 150, making it an ideal environment during the hot summer months.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A pet water cooling device, comprising:
a pet bowl;
a first pump adapted to remove water from the bowl;
a heat transfer device; and
a conduit, the conduit including
a first conduit portion adapted to carry the water to the heat transfer device; and a second conduit portion adapted to carry the water back to the bowl;

wherein the heat transfer device includes a coil submersed in a water reservoir of an evaporative cooler, wherein the evaporative cooler includes,
- the water reservoir;
- a second pump;
- an evaporative pad;
- a water distributor;
- an electric motor; and
- a fan;

wherein, in operation, (1) the second pump brings water from the water reservoir to the water distributor and the water distributor distributes the water to the evaporative pad moistening the evaporative pad; (2) the fan causes air to flow through the evaporative pad moistened by the water, thereby cooling the water and producing cooled air by evaporation; (3) the fan causes the cooled air to flow through an opening into a room; and (4) the cooled water is returned to the water reservoir.

2. The pet water cooling device of claim 1, wherein the pet bowl is a dog bowl.

3. The pet water cooling device of claim 1, wherein the first pump is a submersible pump.

4. The pet water cooling device of claim 1, wherein the coil is a metal coil.

5. The pet water cooling device of claim 1, wherein the evaporative cooler further includes a housing, the housing disposed between studs of a single wall.

6. The pet water cooling device of claim 1, wherein the dog bowl is mountable on an interior wall.

7. The pet water cooling device of claim 1, wherein the dog bowl is mountable on an exterior wall.

8. The pet water cooling device of claim 1, wherein the evaporative cooler is mounted within a wall of a dog house.

9. The pet water cooling device of claim 1, wherein the water cooling device and the evaporative cooler are supplied with water from the same water source.

10. The pet water cooling device of claim 9, wherein the water source is a pipe within a wall.

11. The pet water cooling device of claim 10, wherein the bowl includes a float valve structured and arranged to allow water from the pipe to flow into the bowl when the float valve is activated.

12. A water cooling system, comprising:
- an evaporative cooler;
- a bowl;
- a pump adapted to pump water from the bowl;
- a coil submersed in a water reservoir of the evaporative cooler; and
- tubing, the tubing including
    - a first tube adapted to carry the water through the coil; and
    - a second tube adapted to carry the water back to the bowl;

wherein the temperature of water in the water reservoir is substantially lower than the temperature of the water carried through the coil, such that heat from the water carried through the coil is transferred to the water in the water reservoir wherein the evaporative cooler includes,
- the water reservoir;
- a second pump;
- an evaporative pad;
- a water distributor;
- an electric motor; and
- a fan.

13. The water cooling system of claim 12, wherein the evaporative cooler includes
a housing, the housing disposed between studs of a wall.

14. The water cooling system of claim 13, wherein the bowl is a mounted on the wall and shares the same water source as the evaporative cooler, the water source being a pipe disposed in the wall.

\* \* \* \* \*